(12) United States Patent
Pun (10) Patent No.: US 7,974,402 B2
(45) Date of Patent: Jul. 5, 2011

(54) TDMA MOBILE AD-HOC NETWORK (MANET) WITH SECOND ORDER TIMING AND TRACKING

(75) Inventor: Ngan-Cheung Pun, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 852 days.

(21) Appl. No.: 11/692,361

(22) Filed: Mar. 28, 2007

(65) Prior Publication Data
US 2008/0240050 A1 Oct. 2, 2008

(51) Int. Cl.
*H04J 3/00* (2006.01)

(52) U.S. Cl. ........ 379/350; 370/337; 370/249; 370/503; 370/508; 370/509; 370/519

(58) Field of Classification Search ............... 370/324, 370/350, 395.62, 508, 249, 337, 503, 509, 370/519
See application file for complete search history.

(56) References Cited

U.S. PATENT DOCUMENTS

| 5,969,575 | A | 10/1999 | Helms | 330/294 |
|---|---|---|---|---|
| 6,760,882 | B1 | 7/2004 | Gesbert et al. | 714/774 |
| 7,016,444 | B2 | 3/2006 | Parr et al. | 375/354 |
| 7,221,686 | B1* | 5/2007 | Belcea | 370/509 |
| 2002/0150190 | A1* | 10/2002 | Parr et al. | 375/354 |
| 2002/0154620 | A1* | 10/2002 | Azenkot et al. | 370/347 |
| 2003/0176174 | A1 | 9/2003 | Seppinen et al. | 455/226.1 |
| 2006/0006986 | A1* | 1/2006 | Gravelle et al. | 340/10.3 |
| 2007/0218931 | A1* | 9/2007 | Beadle et al. | 455/502 |

OTHER PUBLICATIONS

Zhou et al., "*A Timer-Based Protocol for Connected Dominating Set Construction in IEEE 802.11 Multihop Mobile Ad Hoc Networks,*" Proceedings of the 2005 Symposium on Applications and the Internet, 7 pages.

Sheu et al., "*A Clock Synchronization Algorithm for Multi-Hop Wireless Ad Hoc Networks,*" Proceedings of the 24th International Conference on Distributed Computing Systems, 2004, 8 pages.

Sun et al., "*Location Aided Broadcast in Wireless Ad Hoc Networks,*" The Ohio State University, Department of Computer and Information Science, Columbus, Ohio, USA, 5 pages.

Ni et al., "*The Broadcast Storm Problem in a Mobile Ad Hoc Network,*" National Central University, Department of Computer Science and Information Engineering, Chung-Li, Taiwan, pp. 151-162.

* cited by examiner

Primary Examiner — Kamran Afshar
Assistant Examiner — Xiang Zhang
(74) Attorney, Agent, or Firm — Allen, Dyer, Doppelt, Milbrath & Gilchrist, P.A.

(57) ABSTRACT

A communication system includes a plurality of mobile nodes forming a mobile ad-hoc network (MANET) and having a network clock time. A plurality of wireless communications links connects the mobile nodes together. Each mobile node includes a communications device and controller for transmitting and routing data packets wirelessly to other mobile nodes via the wireless communications link using a Time Division Multiple Access (TDMA) data transmission. Each mobile node includes a clock circuit having a digital clock time. A clock circuit is operative for processing a second order internal clock compensation factor as a learned and accumulated value for establishing a virtual clock time to correct any clock timing errors of the physical clock time from the network clock time.

23 Claims, 5 Drawing Sheets

FIRST ORDER TIMING TRACKING, STANDARD DEVIATION OF 25 NODES.

FIG. 4

SECOND ORDER TIMING TRACKING, STANDARD DEVIATION OF 25 NODES.

TDMA MOBILE AD-HOC NETWORK (MANET) WITH SECOND ORDER TIMING AND TRACKING

FIELD OF THE INVENTION

The present invention relates to a mobile ad-hoc network (MANET), and more particularly, the present invention relates to the tracking and timing of clocks in a Time Division Multiple Access (TDMA) MANET and related methods.

BACKGROUND OF THE INVENTION

Mobile ad-hoc networks (MANET's) are becoming increasingly popular because they operate as self-configuring networks of mobile routers or associated hosts connected by wireless links to form an arbitrary topology. The routers, such as wireless mobile units, can move randomly and organize themselves arbitrarily as nodes in a network, similar to a packet radio network. The individual units require a minimum configuration and their quick deployment can make ad-hoc networks suitable for emergency situations. For example, many MANET's are designed for military systems such as the JTRS (Joint Tactical Radio System) and other similar peer-to-peer or Independent Basic Service Set Systems (IBSS).

TDMA technology is becoming more popular for use in these mobile ad-hoc networks. In a TDMA ad-hoc network, channel access scheduling is a core platform of the network structure. Some problems, however, are encountered with distributed channel scheduling used in a multi-hop broadcast networks. As known to those skilled in the art, the optimum channel scheduling problem is equivalent to the graph coloring problem, which is a well known NP-complete problem, cited in numerous sources. Many prior art systems assume that the network topology is known and is not topology transparent.

There is a changing topology in a TDMA ad-hoc network. Before the network is formed, the topology cannot be learned. Without knowing the network topology, the nodes in the network should still find a way to communicate. Once the nodes learn about the transmit and receive schedules among neighboring nodes, these neighboring nodes may have moved away, disappeared, or new nodes may have moved in. The rate of resolving the scheduling must be fast and bandwidth efficient such that the network can be stabilized.

Nodes operative in a TDMA MANET typically use a crystal as part of its clock. Each node's clock should be synchronized, but typically there is some deviation such that each node (or radio) could have a different clock timing. This can occur even when higher quality crystals are used.

As a result, there can be a high network timing dispersion that requires a long guard time. As a result, the time spent for a node to separate from the group of other nodes is limited by how fast its clock drifts from the other clocks in the group. For example, physical radios could have a different clock drift rate, which may also change with temperature. Currently, some first order time tracking occurs where a new timing reference is tracked by an average of time frames of neighboring nodes. Smoothing brings the network timing dispersion down, but its dispersion process does not stop. The time span for a node to leave the group without synchronization problems, however, is still limited by the divergence of the clock drift. A long guard time is still required.

It is possible for an internal clock of a node to adjust periodically to a GPS time such that any network timing dispersion is minimized. GPS must be equipped at each node, however, and a GPS signal is not always available. Some proposals have a time server distribute a time stamp as a standard network clock, and all nodes resynchronize their internal clock to the new time stamp. The network timing dispersion resulting from clock draft, however, continues and a long guard time is required.

SUMMARY OF THE INVENTION

A communication system includes a plurality of mobile nodes forming a mobile ad-hoc network (MANET) and having a network clock time. A plurality of wireless communications links connect the mobile nodes together. Each mobile node includes a communications device and controller for transmitting and routing data packets wirelessly to other mobile nodes via the wireless communications link using a Time Division Multiple Access (TDMA) data transmission. Each mobile node includes a clock circuit having a digital clock time. A clock circuit is operative for processing a second order internal clock compensation factor as a learned and accumulated value for establishing a virtual clock time to correct any clock timing errors of the physical clock time from the network clock time.

The virtual clock time can be established over multiple iterations. The clock circuit within a mobile node can be operative for comparing a physical clock time to a clock mean value that has been established for all mobile nodes within the MANET and establishing the virtual clock time. A mobile node can also be operative for obtaining an average value for the physical clock within mobile nodes of the MANET. A mobile node can be operative for determining a physical clock error for a clock by subtracting a mean value based on the calculated average value and scaling the virtual clock time that has been established by a correction value.

In yet another aspect, the internal clock compensation factor can be bound by a decaying factor. The mobile node can be operative for correcting timing offsets with a reference to a common hypothetical clock and calculating standard deviation at each measurement period of the timing offset. A timing reference can be propagated throughout the network for synchronizing a plurality of mobile nodes.

In yet another aspect, the MANET can be formed by a source mobile node, destination mobile node, and plurality of neighboring mobile nodes. The average value for the physical virtual clocks can be obtained within neighboring mobile nodes and other factors established.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example of the present invention, a communications system uses second order timing tracking to reduce the guard time and increase the time spent for a node to leave the group without synchronization problems. The divergence of a different clock drift rate is minimized and is distributed as an adaptive scheme.

The system uses a virtual internal clock in each node with an internal clock compensation factor. The clock drift rate becomes adjustable because of a virtual clock drift rate. By using a second order timing for tracking, a node can learn the environment, i.e., a neighboring node's clock, and train itself. A node establishes a virtual network clock and such nodes "virtually" have an identical clock even though physical clocks may deviate. Thus, a node may drift away from the group and drift away from the timing they used to have with the network, but the node can come back and readjust, i.e., "learn" about the network clock. With second order timing, the node adjusts based on a learning algorithm.

Figure 1:
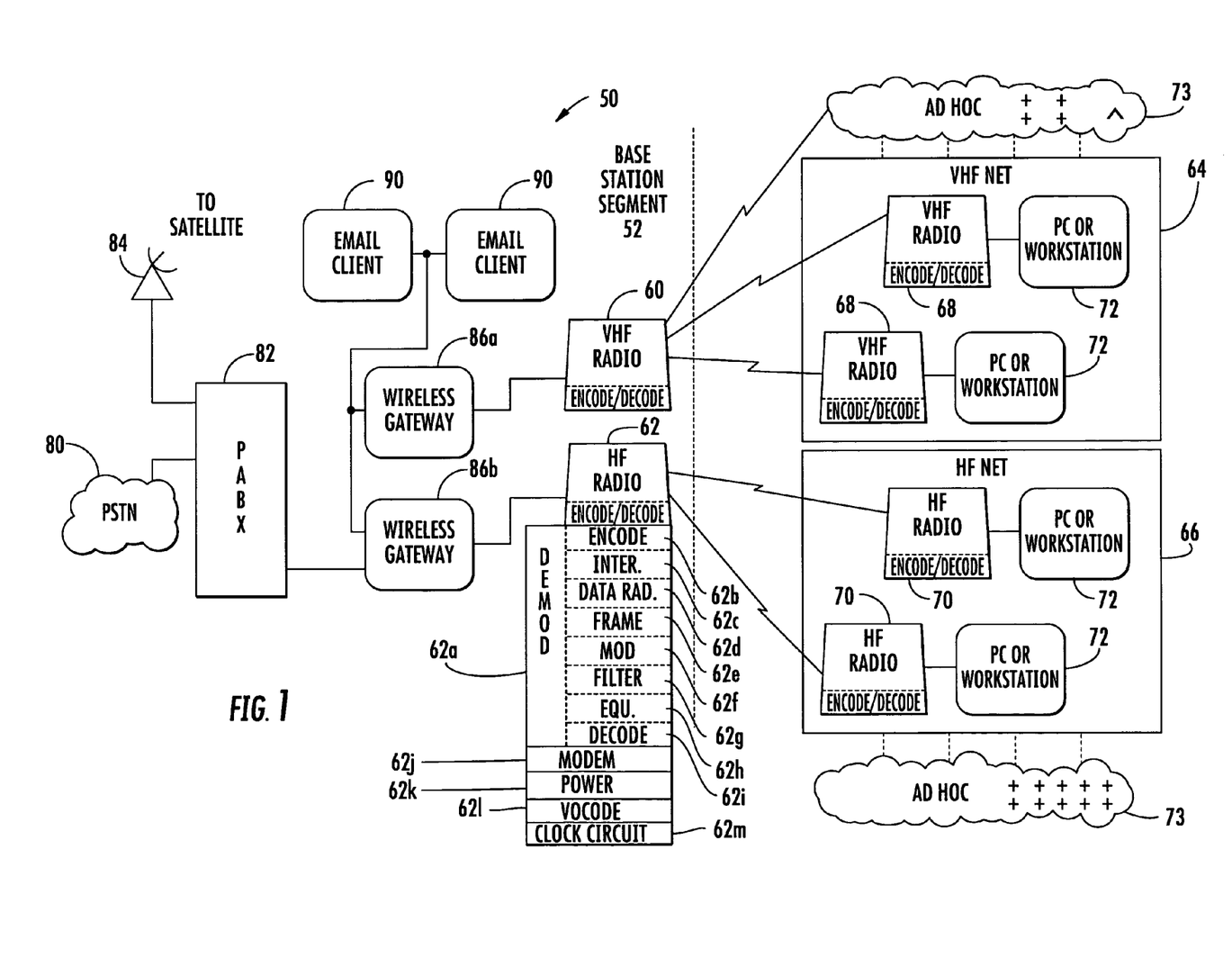
FIG. 1 is a block diagram of an example of a communication system that can be used in accordance with non-limiting examples of the present invention.

An example of a communications system that can be used and modified for use with the present invention is now set forth with regard to FIG. 1, followed by a description of a TDMA MANET and the system in accordance with a non-limiting example of the present invention.

An example of a radio that could be used with such system and method is a Falcon™ III radio manufactured and sold by Harris Corporation of Melbourne, Fla. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that could incorporate the second order timing tracking in accordance in accordance with a non-limiting example, is described relative to a non-limiting example shown in FIG. 1. This high-level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68, 70. Ad-hoc communication networks 73 are interoperative with the various components as illustrated. The entire network can be ad-hoc and include source, destination and neighboring mobile nodes. Thus, it should be understood that the HF or VHF networks include HF and VHF net segments that are infrastructureless and operative as the ad-hoc communications network. Although UHF radios and net segments are not illustrated, these could be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. A vocoder circuit 62l can incorporate the decode and encode functions and a conversion unit could be a combination of the various circuits as described or a separate circuit. A clock circuit 62m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

There now follows a general description of MANET TDMA processes as commonly used, followed by a description of the second order timing tracking.

As is well known, ad-hoc network routing and data delivery is a difficult and complex problem. There are many different routing protocols and methods used to solve different aspects of the network issues. A background of the technology is given followed by a description of second order timing tracking and tracking in accordance with a non-limiting example of the present invention.

A Mobile Ad-hoc Network (MANET) can be described as an autonomous system of mobile nodes. The network is typically self-organizing without the assistance from any centralized administration. Because there are no fixed and centralized base stations to maintain routes, the routing capability is typically distributed to the individual mobile nodes. Each node is usually capable of discovering routes to a destination, and each node may also act as an intermediate node, i.e., a repeater, for forwarding the data packets in a multiple hop connection. The network topology may change with time as the nodes move, enter, or leave the network. Therefore, dynamic routing capabilities and route maintenance mechanisms are usually incorporated into the nodes.

There have been many different ad-hoc network protocols, which are usually divided into two different approaches, i.e., 1) proactive, and 2) reactive. Proactive protocols, such as OLSR, CGSR, DBF, and DSDV, periodically send and exchange routing messages in the entire network to catch up with the latest changes in the topology. Reactive protocols, such as ABR, DSR, AODV, CHAMP, DYMO, and TORA, however, search for a route on-demand. A route discovery or route request message is typically flooded into the network upon request. As the request message comes to the destination node, a route reply message, carrying the whole path from the source to the destination, is transmitted back to the source node.

Some protocols combine the two approaches, but in any event, the goal of the ad-hoc routing protocol is to find the current path, defined as a sequence of intermediate nodes, from the source node to a destination node. Due to the changing topology and channel conditions, however, the routes may have changed over time. Therefore, a route entry in the routing table may not be updated when it is about to be used. The routes must be maintained either on demand or on a regular basis.

Routes can be maintained in two different levels. A first level is more concerned with the maintenance of the routing table, which is refreshed either on a regular basis or on-demand. A second level is the maintenance of an actively used route path, which may have become unstable and unusable due to the node movement, blocking by objects, terrain conditions, and other link impairments. The source node should be notified of the path errors, and another candidate route chosen or a new route discovery issued.

For table driven routing protocols, once a broken route is detected, it may take some time for the protocol to react and resolve and find a new route. Most link state based ad-hoc network protocols require a convergence of routes in the route table. For example, in Optimized Link State Routing (OLSR) protocol, a local route change would have to be broadcast to all other nodes in the network such that in the route table, the topology view is consistent. IT the route table is not consistent, data packets may not be routed correctly. The data packets are forwarded from hop to hop, originating from the source node towards the destination node. Due to the node movement, some of the intermediate nodes may have already moved out of the range of each other, therefore breaking the path of delivery. Packets sometimes are dropped and the broken path condition should be detected as soon as possible to form alternative paths.

For reactive ad-hoc network protocols, the route is typically discovered on-demand. The nodes in the network keep track of the changes of the topology, but only for the part on which they send traffic. Before data is sent, the destination path is discovered by sending a route request. It takes some time for the route request to travel to the destination node, which returns the path back to the source node. Explicit route path information can be added to the packet header such that intermediate nodes can forward the packet.

A data path can also be set-up in advance. A source node transmits a path label along a newly discovered route to the destination node. The intermediate nodes remember the path label. Subsequently, the data packets having a known label are forwarded correctly. Again, if the data packet cannot be forwarded correctly along the path, the source node is notified of the path error. The source node may issue a new route discovery.

Some protocol provides local repair to a broken route. A repairing node may issue a locally bounded, limited path search downstream of the path. Due to the scope of a limited search, the response time is expected to be faster. If it is successful, then the packets may flow through the detour route. The repairing node would send a notification to the source node about the change to the path. Local repair shortens this reaction time to fixing the path failure. The mechanism, however, is not instantaneous.

A data packet can typically be forwarded from the source node to the destination node by two major methods. The forwarding decision can be made by the source node such that explicit route information is attached to the packet header. In the second method, the forwarding decision is made by intermediate nodes. If the node has a view of the network topology, the packet may be forwarded based on the routing table. If the node has a label path established for labeled packets, the forwarding decision can be based on the label of the packet. If the node has no knowledge of the network, and no established data path, the packet can be flooded to all neighbors.

In a unidirectional link, however, the sender node may not know if the receiver node actually received the packet. The sender node may have an excessive number of packets in its transmission queue. The packet to be delivered may be removed as if the packet is expired. The receiver node and the sender node may have moved apart further than the transmission range so that the packet can never by delivered via this specific link. The packets could be corrupted by signal fading or interference. ARQ (Automatic Repeat request) may be used to ensure a transmission success and a detection of a broken link. A significant delay may be incurred, however, waiting for an ACK and retransmission. Fault tolerance can be provided using multiple paths to deliver the same set of packets. More data packets can be delivered with less delay, but some trade-off is the radio resource utilization that is significantly reduced.

In ad-hoc networks, nodes are equipped with limited radio resources and data bandwidth. Data packets are typically classified according to the application requirement. Some applications require the data to be delivered in a time critical manner, while other applications require the data to be delivered in a robust manner. It is important to deliver different kinds of data packets differently and effectively according to the demands imposed by the system. For example, dropping a few voice samples is not as important as dropping a file data packet. Usually, a file data packet is less time critical, but it must be reliably delivered.

Due to the issues of data delivery and Quality of Service (QOS) requirements, packets may be duplicated in multiple communication paths so that the same packet has a higher chance of reaching its destination in time. In many multi-path routing protocols, the source node maintains a set of multiple communication paths as alternate routes in its route table. It should be understood that multi-path routes can be discovered in a similar fashion as a general route discovery.

Most of the generic route discovery mechanisms result in multiple paths without extra efforts. It is up to the source node to decide how many multi-path candidates should be maintained in the route table. When the source node is about to transmit a data packet to a destination with multi-path routes, the node may duplicate data packets, each on a separate member route of the multi-path, or the source node may use an alternative path as a backup path in case the main path is notified as broken. A higher level of fault tolerance can be achieved by sending duplicated data packets. The multiple paths can be fully disjointed or partially disjointed. A better fault tolerance can be served by the fully disjointed multiple paths. As multiple paths are used for fault tolerance, data packets are being forwarded redundantly on each member route of the multi-path. The network wide bandwidth consumption will be proportionally increased.

As set forth, there are a number of common terms used in the field. For example, a slot can be a basic TDMA time division structured by frames and slots. In each second, there are typically N number of frames, and in a frame, there are M number of time slots. Usually, each active mobile unit would have a chance, i.e., a time slot, to transmit in every frame.

A frame can be considered as a general TDMA time division unit as explained in reference to a slot.

A beacon can be a TDMA burst that is usually short and completed to one slot. It could contain control information or controlled messages. In a HP-Net, a beacon can be transmitted in a slot. In a general TDMA scheme, it is typically transmitted in a generic time slot.

A beacon slot is typically the same as a slot.

In a 1-hop neighborhood, any neighboring node that is directly connected with a single link could be considered as the 1-hop neighborhood.

In a 2-hop neighborhood, any neighboring nodes that are directly connected with the maximum of 2-hops, 2 links away, could be considered as a 2-hop neighborhood.

Network density could be referred to as the number of nodes in a per 1-hop neighborhood, the number of nodes in a per 2-hop neighborhood, or the number of nodes in a per geographical area.

A node could represent a mobile unit in a network topology.

Users are typically considered nodes and sometimes are also called mobile users.

In channel access in TDMA, a channel can be defined by an exclusive use of a time slot in multiple frames. A node could be considered to have a channel when it is allowed to use a fixed time slot in all subsequent frames.

A channel collision could be a continuous slot collision in multiple frames. It usually results from more than one node trying to transmit in the same net channel, which is the same slot in the frame.

Referring now to FIGS. 2-5, there now follows a description for the second order timing tracking system and method used, for example, in TDMA MANETS.

Figure 2:
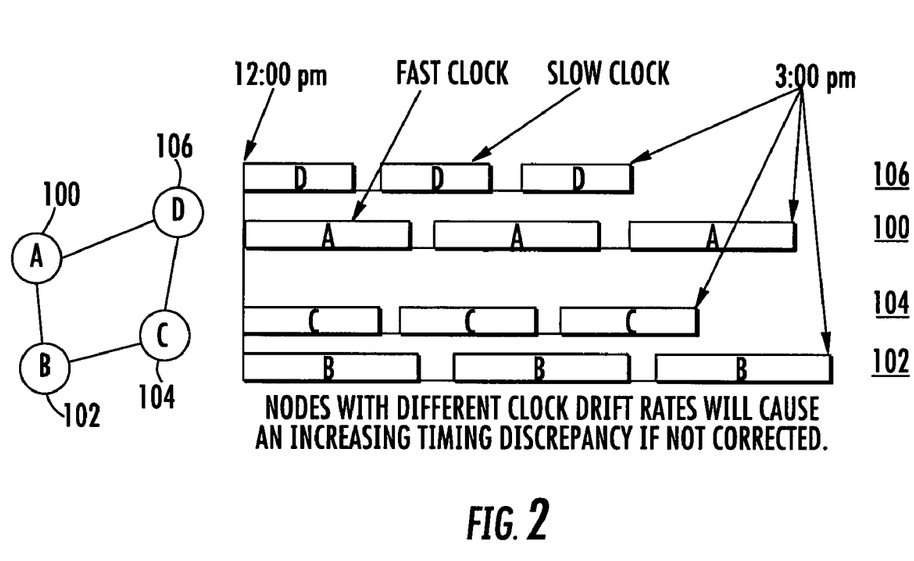
FIG. 2 is a graph showing network timing dispersion in which nodes with different clock drift rates will cause an increasing time discrepancy if not corrected.

It should be understood that there is a network timing dispersion such that a long guard time is required. A time span for a node separate from a group is limited by how fast its clock is drifting away from the group's clock. Physical radios could have a different clock drift rate, which may also change with temperature. For example, as shown in FIG. 2, nodes A-D are represented by numerals 100, 102, 104 and 106 respectively. Each node has its own internal clock. Each labeled block represents one hour of each clock. In this example as illustrated, three hours later, the timing of the nodes is separated. Three o'clock p.m. is different for each node, as illustrated.

Some proposals use smoothing as a type of first order timing and tracking to overcome such problems. A new timing reference is tracked by an average of time frames of neighboring nodes. Smoothing brings the network timing dispersion down. The dispersion process, however, is not stopped. The time span for a node to leave the group without synchronization problems is still limited by the divergence of the clock drift, and a long guard time is still required.

In other solutions, the internal clock is adjusted periodically to a GPS time. Network time and dispersion as a result is minimized. A GPS device must be equipped at a node and a GPS signal is not always available.

Figure 3:
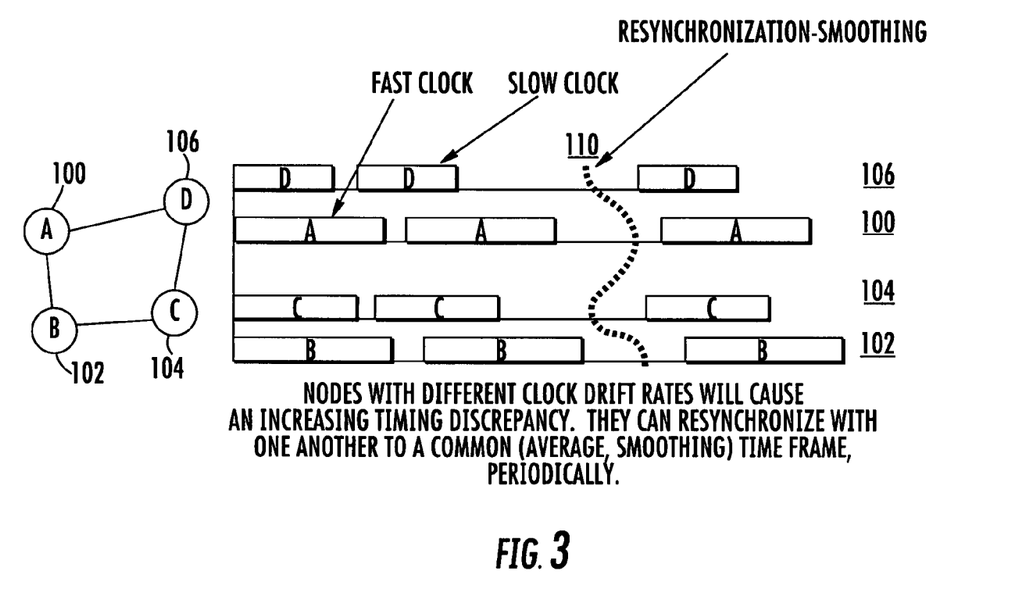
FIG. 3 is a graph showing first order timing tracking in which nodes with different clock drift rates will cause an increasing timing discrepancy such that nodes can resynchronize with each other to a common time frame, periodically.

FIG. 3 shows a fast clock at node A (100), a slow clock at node D (106) and resynchronization-smoothing 110. In this example, nodes with different clock drift rates can cause an increase in timing discrepancy. The nodes can resynchronize with each other to a common (average, smoothing) time frame, periodically.

A network clock can be distributed. A time server can distribute a time stamp as the standard network clock. All nodes can resynchronize their internal clock to the new time stamp. The network timing dispersion due to clock drift can still continue and a long guard time is required.

In accordance with a non-limiting example of the present invention, a second order timing tracking is established that reduces the guard time and significantly increases the time span for a node to leave the group and come back without a synchronization problem. The divergence of different clock drift rates is minimized and is distributed with an adaptive scheme and is simple to implement.

The system and method in accordance with a non-limiting example of the present invention uses a virtual internal clock in each node. This establishes an internal clock compensation factor (ICCF) that is added (processed) as a second order compensation factor to a resynchronization algorithm. The ICCF is a real multiplication factor and is a learned and accumulated value over multiple iterations of correcting the timing error. The virtual clock drift rate can equal the physical clock drift rate multiplied by the ICCF. Thus, the clock drift rate becomes adjustable.

Figure 4:
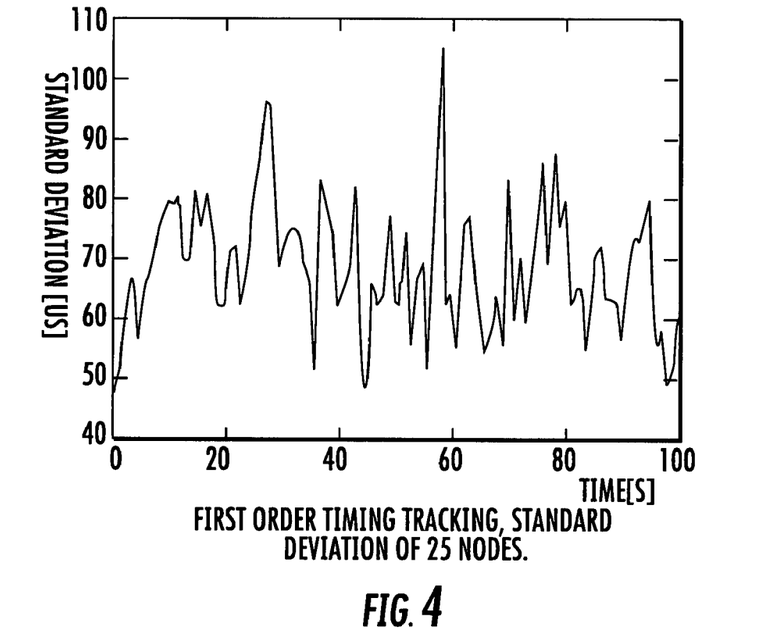
FIG. 4 is graph showing first order timing tracking with a standard deviation of twenty-five nodes.
Figure 5:
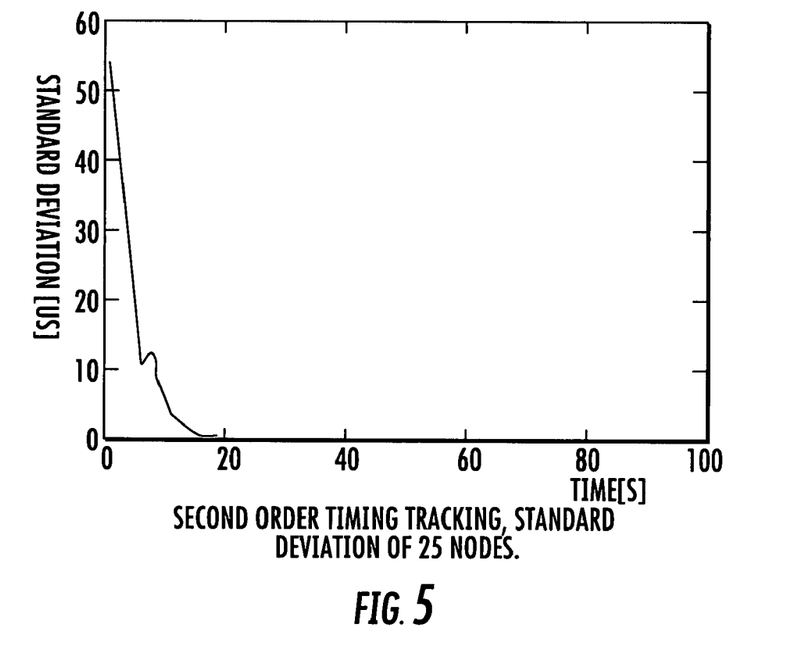
FIG. 5 is a graph showing second order timing tracking with a standard deviation of twenty-five nodes.

FIGS. 4 and 5 are graphs showing timing and tracking of 25 nodes over a period of time. In these examples, the epoch timing of all nodes are smoothed every second with the neighbors, such that each node has about five neighboring nodes. The statistics of all 25 nodes' timing offset is collected with reference to a common hypothetical clock. Standard deviations can be calculated at each measurement period.

FIG. 4 shows a simple smoothing algorithm in which the timing difference is tracked and kept to level of less than 100 ms.

FIG. 5 shows a second order tracking algorithm in which the timing difference is diminishing over time because of the learned ICCF. The virtual clock at a node has a corrected clock drift from the physical clock.

An example of second order timing tracking equations that can be used in accordance with a non-limiting example of the present invention are now set forth.

TR (A, k): Node-A, Timing reference at time kth second.
TR (A, k, AVE): Node-A, Average Timing reference of all 1-hop nodes at kth second.
ICCF (A, k): Node-A, the Internal Clock Compensation Factor at kth second.
E (A, k): The timing "error" at kth second.
ADJ_E (A, k): The timing adjustment at kth second.
Alpha: Learning Roll off factor=0.8

$$E(A,k+1)=TR(A,k)-TR(A,k,AVE); \text{error} \quad 1.$$

$$ADJ\_E(A,k+1)=E(A,k+1)*\text{Alpha}; \text{adjusted error} \quad 2.$$

$$ICCF(A,k+1)=\{TR(A,k)-ADJ\_E(A,k+1)\}/\{TR(A,k)\} \quad 3.$$

$$\text{Virtual Clock}=\text{Physical Clock}*ICCF(A,k+1); \text{result1} \quad 4.$$

$$TR(A,k+1)=TR(A,k)*ICCF(A,k+1); \text{result 2} \quad 5.$$

FIG. 5 is another example of a timing graph showing four nodes $100(a)$ as node-1; $102(b)$ as node-2; $104(c)$ as node-3; and $106(d)$ as node-4. The timing graph also shows a clock mean value (CMV) 120, a first order adjustment (ADJ) 122, a physical clock period (PCP) 124 and virtual clock period (VCP) 126. Various equations and measurements are illustrated below the graph.

Figure 6:
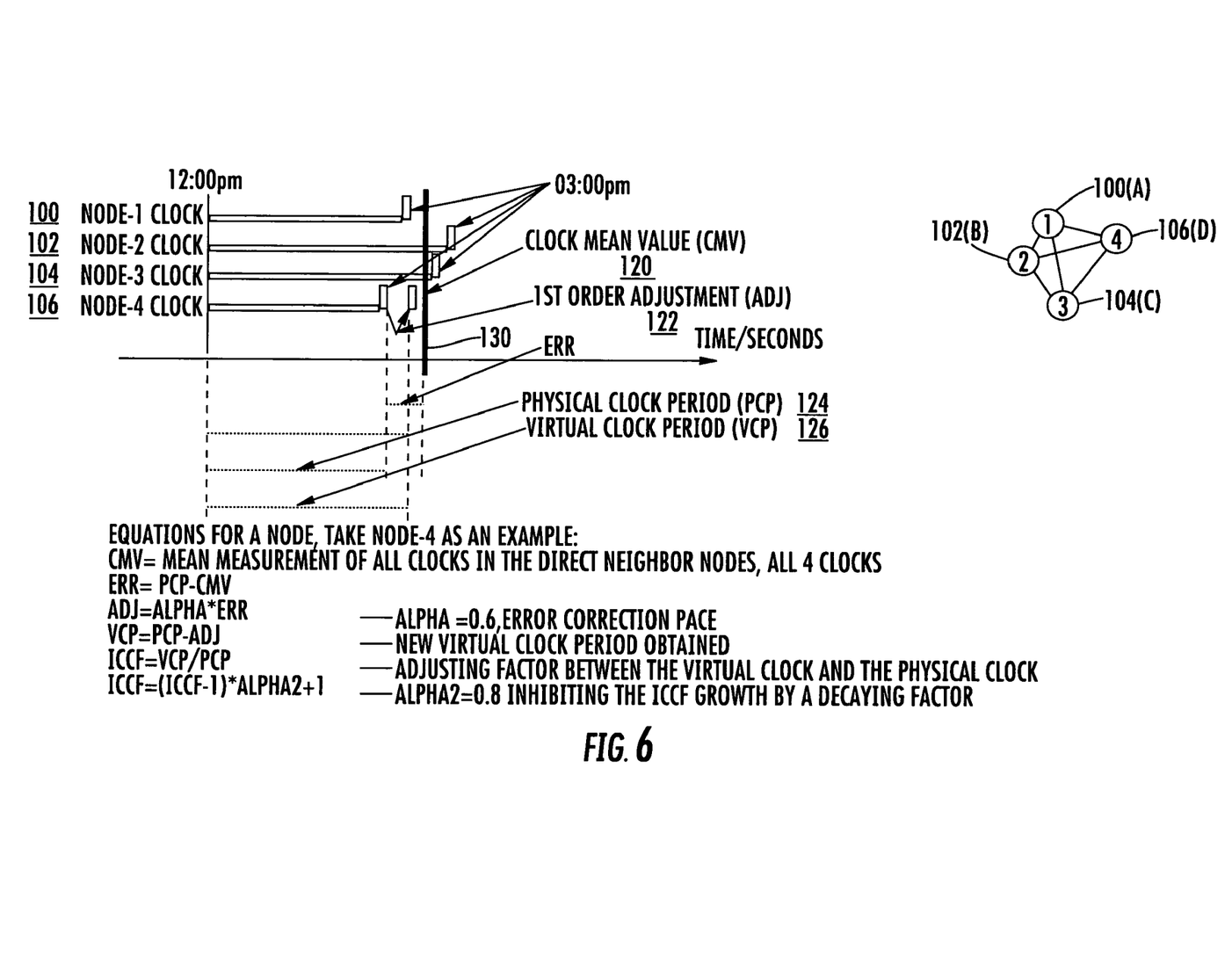
FIG. 6 is a graph showing four nodes and clocks and showing an Internal Clock Compensation Factor (ICCF).

In that example shown in FIG. 5, the graph has four nodes 100-106 that could be generalized to many nodes. The horizontal bars indicate the physical clock of each node and each has a different length that represents the clock speed or clock growth rate. The vertical bar 130 is the average value of all clocks, measured by a node, for example, node-4. In this example, node-4 could take its own physical clock period and compare it to the clock mean value (CMV) and the difference is the error (ERR). Node-4 could adjust its clock such that next time when the measurement is made the error will be smaller. To be gradual and avoid isolations, the adjustment is scaled by a "correction pace" factor, alpha. Node-4 thus has a newly obtained virtual clock that is presented as a "clock," called VCP, which has a scaling factor related to its own physical clock period (PCP). The ICCF relates directly to the physical clock. To prevent a group drift of ICCF in the network, it can be further contained by a decaying factor, alpha 2. This decaying factor could set the virtual clock as close as possible to the physical clocks. The last equation in FIG. 6 represents the ICCF decaying factor.

The system and method in accordance with a non-limiting example of the present invention reduces the guard time and reduces the effect of the divergence of different clock drift rates in network synchronization. It is a distributed and adaptive scheme and is simple to implement. Notably, it can reduce guard time in a TDMA system to increase bandwidth efficiency.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
a plurality of mobile nodes forming a mobile ad-hoc network (MANET) and having a network clock time;
a plurality of wireless communications links connecting the mobile nodes together;
each mobile node comprising a communications device and controller for transmitting and routing data packets wirelessly to other mobile nodes via the wireless communications link using a time division multiple access (TDMA) data transmission, each mobile node communicating at a selected guard time and further comprising a clock circuit having a physical clock time, wherein a clock circuit is operative for for establishing a virtual clock time based on a timing error adjustment obtained from a clock mean value subtracted from the physical clock time, wherein said virtual clock time is processed with the physical clock time to establish a second order internal clock compensation factor as a learned and accumulated value and obtain a virtual clock drift rate that is used to correct any clock timing errors of the physical clock time from the network clock time and reduce the guard time.

2. The communications system according to claim 1, wherein said virtual clock time is established over multiple iterations.

3. The communications system according to claim 1, wherein a clock circuit within a mobile node is operative for comparing its physical clock time to a clock mean value that has been established for mobile nodes within the MANET and establishing the virtual clock time.

4. The communications system according to claim 1, wherein a mobile node is operative for obtaining an average value for the physical clocks within mobile nodes of said MANET.

5. The communications system according to claim 4, wherein a mobile node is operative for determining a physical clock error for its clock by subtracting a mean value based on the calculated average value and scaling the virtual clock time that has been established by a correction value.

6. The communications system according to claim 5, wherein the internal clock compensation factor is bound by a decaying factor.

7. The communications system according to claim 5, wherein a plurality of mobile nodes within the MANET are operative for collecting timing offsets with reference to a common hypothetical clock and calculating standard deviations at each measurement period of the timing offset.

8. The communications system according to claim 1, and further comprising a timing reference that is propagated throughout the network for synchronizing a plurality of mobile nodes.

9. A mobile ad-hoc network (MANET), comprising:
a source mobile node, a destination mobile node, and a plurality of neighboring mobile nodes, each mobile node comprising a communications device and controller for transmitting and routing data packets wirelessly to other mobile nodes using a time division multiple access (TDMA) data transmission at a selected guard time;
each mobile node further comprising a clock circuit having a physical clock time; and
wherein a clock circuit is operative for establishing a virtual clock time based on a timing error adjustment obtained from a clock mean value subtracted from the physical clock time, wherein said virtual clock time is processed with the physical clock time to establish a second order internal clock compensation factor as a learned and accumulated value and obtain a virtual clock drift rate that is used to correct any clock timing errors of the physical clock time from a network clock time and reduce the guard time.

10. The communications system according to claim 9, wherein said virtual clock time in a mobile node is established over multiple iterations.

11. The communications system according to claim 9, wherein a clock circuit within a mobile node is operative for comparing its physical clock time to a clock mean value that has been established for neighboring mobile nodes and establishing the virtual clock time.

12. The communications system according to claim 9, wherein a mobile node is operative for obtaining an average value for the physical clocks within neighboring mobile nodes.

13. The communications system according to claim 12, wherein a mobile node is operative for determining a physical clock error for its clock by subtracting a mean value based on the calculated average value for physical clocks in neighboring mobile nodes and scaling the virtual clock time that has been established by a correction value.

14. The communications system according to claim 13, wherein the internal clock compensation factor is bound by a decaying factor.

15. The communications system according to claim 13, wherein timing offsets are collected by neighboring mobile nodes with reference to a common hypothetical clock to calculate standard deviations at each measurement period of the timing offset.

16. The communications system according to claim 9, and further comprising a timing reference that is propagated throughout the network for synchronizing a plurality of mobile nodes.

17. A method for communicating between mobile nodes within a mobile ad-hoc network (MANET) using a time division multiple access (TDMA) data transmission, comprising:
transmitting and routing data packets wirelessly to other mobile nodes via wireless communications links at a selected guard time, each mobile node comprising a communications device, controller and a clock circuit having a physical clock time;
establishing a virtual clock time based on a timing error adjustment obtained from a clock mean value subtracted from the physical clock time; and
processing the virtual clock time with the physical clock time to establish a second order internal clock compensation factor as a learned and accumulated value and obtain a virtual clock drift rate that is used to correct any clock timing errors of the physical clock time from a network clock time to reduce the guard time.

18. The method according to claim 17, which further comprises establishing the virtual clock time over multiple iterations.

19. The method according to claim 17, which further comprises comparing a physical clock time within a mobile node to a clock mean value that has been established for neighboring mobile nodes within the MANET and establishing the virtual clock time.

20. The method according to claim 17, which further comprises obtaining an average value for the physical clocks within mobile nodes of the MANET.

21. The method according to claim 20, which further comprises determining a physical clock error in a clock by subtracting a mean value based on the calculated average value for physical clocks and scaling the virtual clock time that has been established by a correction value.

22. The method according to claim 20, which further comprises collecting timing offsets with reference to a common hypothetical clock and calculating standard deviations at each measurement period of the timing offset.

23. The method according to claim 17, which further comprises propagating a timing reference throughout the network for synchronizing a plurality of mobile nodes.

* * * * *